UNITED STATES PATENT OFFICE.

CHARLES E. MUNROE, OF WASHINGTON, DISTRICT OF COLUMBIA, ASSIGNOR TO KUHN FORMALDEHYDE GENERATOR COMPANY, A CORPORATION OF VIRGINIA.

PROCESS OF COATING WITH METAL.

SPECIFICATION forming part of Letters Patent No. 724,317, dated March 31, 1903.

Application filed September 6, 1902. Serial No. 122,403. (No specimens.)

*To all whom it may concern:*

Be it known that I, CHARLES E. MUNROE, a citizen of the United States, residing at Washington, in the District of Columbia, have invented certain new and useful Improvements in Processes of Coating with Metal, of which the following is a description.

My invention relates to the formation upon surfaces of metal or other inorganic material of a coating of a metal or its oxids in a finely-divided state; and it consists in the hereinafter-described process of producing such a coating by the use of a soluble compound of the metal and a soluble compound with which the compound of the metal will react to form a precipitate and subsequently decomposing the precipitate.

My process while not confined to any particular purpose is particularly adapted to the formation upon perforated sheets or disks of asbestos and upon sheets or disks of perforated metal or woven wire of a coating of finely-divided platinum to adapt such plates or disks to be used in the slow combustion of methyl alcohol for the purpose of generating formaldehyde, and my invention is herein described as applied to this purpose.

In carrying out my invention I take a sheet of the material on which the coating is to be formed—as, for instance, a sheet of asbestos having perforations therein to adapt it to be used in a formaldehyde-generator—and immerse the sheet in an alcoholic solution of ammonium chlorid and then immerse it in an alcoholic solution of platinic chlorid, though, if preferred, the sheet may be first immersed in the platinic chlorid and subsequently in the ammonium chlorid. The result produced, which is the same whether the ammonium chlorid or the platinic chlorid is first used, is a reaction of the two compounds, forming upon the surface of the asbestos a crystalline precipitate of the ammonium-platinic chlorid. When the precipitate has been formed, I heat the sheet of asbestos. The heat acts first to drive off the alcohol and then decomposes the double platinum salt, leaving the metal in a very finely-divided state upon the surface of the asbestos.

By reason of the fact that the double platinum salt formed by the reaction of the ammonium chlorid and platinic chlorid is practically insoluble in alcohol the precipitate will be formed, as above stated, upon the surface of the asbestos and not throughout the body of the material, thus avoiding the use of any greater quantity of platinum than is necessary and producing a uniform finely-divided or porous coating upon the surface only, so as to secure the maximum catalytic effect with the minimum expenditure of platinum.

Having thus described my invention, what I claim, and desire to secure by Letters Patent of the United States, is—

1. The process of forming upon metallic or other surfaces a coating of finely-divided metal which consists in successively immersing the body to be coated in a solution of a compound of the metal and in a solution of a compound adapted to react upon the compound of the metal to form a crystalline compound of the metal, and subsequently heating the body thus coated; substantially as described.

2. The process of forming upon the surface of asbestos, a coating of finely-divided platinum which consists in successively immersing the asbestos in a solution of platinic chlorid and in a solution of ammonium chlorid and subsequently heating the asbestos; substantially as described.

3. The process of forming upon the surface of asbestos, a coating of finely-divided platinum which consists in successively immersing the asbestos in an alcoholic solution of platinic chlorid and in an alcoholic solution of ammonium chlorid and subsequently heating the asbestos; substantially as described.

In testimony whereof I affix my signature in presence of two witnesses.

CHARLES E. MUNROE.

Witnesses:
A. P. GREELEY,
GRAFTON L. MCGILL.